United States Patent [19]

Ueno

[11] Patent Number: 4,521,876

[45] Date of Patent: Jun. 4, 1985

[54] FOCUSING STATE MONITORING APPARATUS IN OPTICAL RECORDING APPARATUS

[75] Inventor: Ichiro Ueno, Isehara, Japan

[73] Assignee: Victor Company of Japan, Limited, Yokohama, Japan

[21] Appl. No.: 197,581

[22] Filed: Oct. 16, 1980

[30] Foreign Application Priority Data

Oct. 18, 1979 [JP] Japan ............................... 54-134844

[51] Int. Cl.³ .......................... G11B 7/12; G11B 27/36
[52] U.S. Cl. ......................................... 369/54; 369/58
[58] Field of Search ........................... 369/13, 45–46, 369/54, 58, 106, 109–112, 116

[56] References Cited

U.S. PATENT DOCUMENTS

| 2,318,138 | 5/1943 | Benfer | 369/54 |
| 4,027,330 | 5/1977 | Maslowski et al. | 369/13 |
| 4,093,961 | 6/1978 | Kanamaru | 369/116 |
| 4,100,577 | 7/1978 | Naruse | 369/45 |
| 4,315,283 | 2/1982 | Kinjo et al. | 369/13 |

FOREIGN PATENT DOCUMENTS

| 2854474 | 6/1979 | Fed. Rep. of Germany . | |
| 54-151806 | 11/1979 | Japan | 369/112 |
| 301391 | 5/1930 | United Kingdom . | |
| 357627 | 9/1931 | United Kingdom . | |
| 417741 | 10/1934 | United Kingdom . | |
| 481461 | 3/1938 | United Kingdom . | |
| 498394 | 1/1939 | United Kingdom . | |
| 653342 | 5/1951 | United Kingdom . | |
| 1389831 | 4/1975 | United Kingdom . | |
| 2006427A | 5/1979 | United Kingdom . | |
| 2012996A | 8/1979 | United Kingdom . | |

Primary Examiner—Raymond F. Cardillo, Jr.
Attorney, Agent, or Firm—Louis Bernat

[57] ABSTRACT

A monitoring apparatus is used in an optical recording apparatus which performs the recording by respectively forming a first beam spot and a second beam spot by focusing light beam portions respectively having diameters smaller than that of first light beam and second light beam respectively modulated by first signal and second signal on a recording medium by use of focusing lens. The monitoring apparatus comprises an enlarging and imaging optical system for enlarging and imaging reflected beams of the first and second beam spots from the recording medium, by obtaining the reflected beams outside optical paths of the first and second light beams, reflecting optical system for reflecting the first and second light beams at an optical path leading to the focusing lens for focusing the first and second light beams by use of an optical member, and supplying the reflected first and second light beams to the enlarging and imaging optical system as incident light, and monitoring optical system for monitoring images imaged by the enlarging and imaging optical system.

3 Claims, 7 Drawing Figures

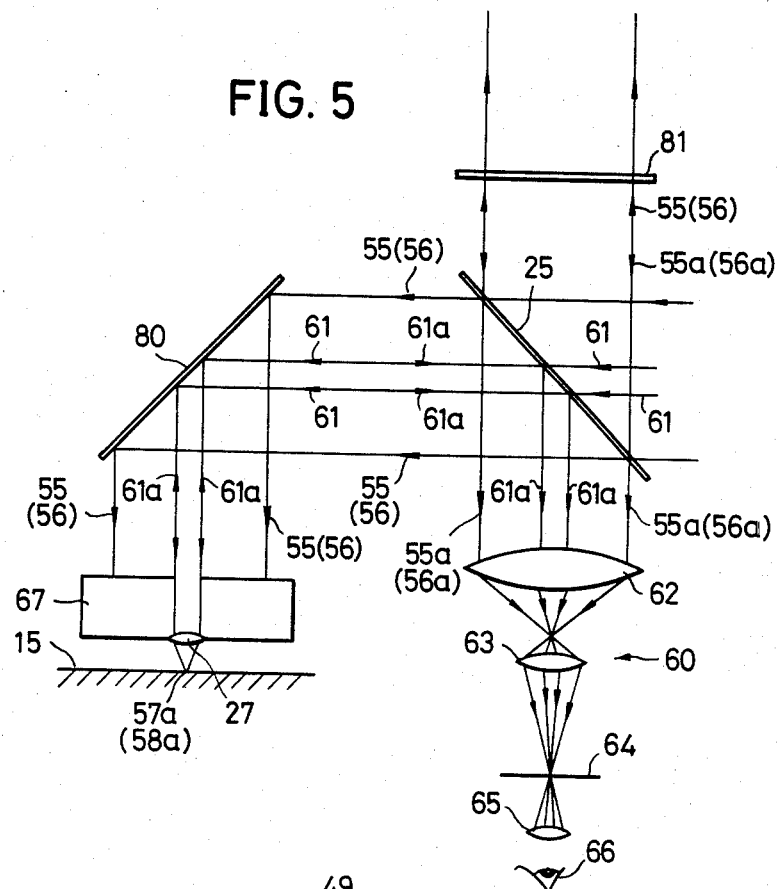
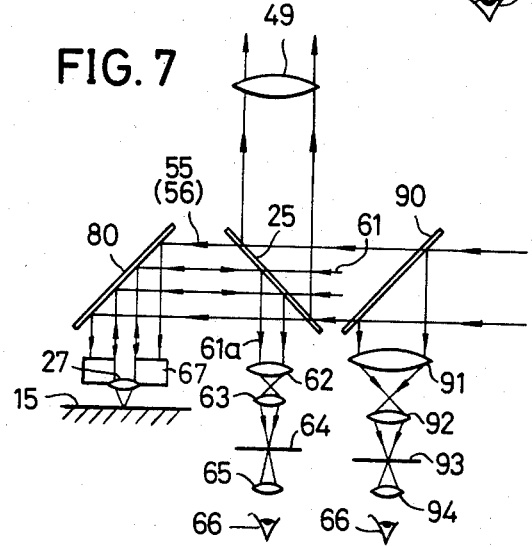

FOCUSING STATE MONITORING APPARATUS IN OPTICAL RECORDING APPARATUS

BACKGROUND OF THE INVENTION

The present invention relates generally to a focus monitoring apparatus in an optical recording apparatus, and more particularly to a focus monitoring apparatus capable of monitoring the focused states of two optical beam spots and two optical beams to be focused on a surface of a recording medium with high accuracy.

The systems known heretofore for recording and reproducing information signals such as video signals and/or audio signals on and from disc-shaped, rotary mediums (referred to hereinafter simply as "discs") are broadly divided into sysems in which reproduction is carried out optically, systems in which reproduction is carried out by means of a reproducing stylus employing a piezoelectric element, and systems in which reproduction is carried out by utilizing variations in the electrostatic capacitance between an electrode on the reproducing stylus and the recorded surface of the disc.

We have considered the advantages and disadvantages of these three kinds of systems and have adopted the electrostatic capacitance system as being the most desirable. Further, the present inventor has described a new system for overcoming the problems accompanying known electrostatic capacitance system, in a U.S. patent application entitled "Information signal recording and reproducing system", Ser. No. 785,095.

More specifically, in accordance with a known electrostatic capacitance system, recording is accomplished by forming a spiral guide groove in the disc for guiding the reproducing stylus. At the same time, pits are formed in responsive correspondence with an information signal to be recorded on the bottom surface of the groove. In the reproducing system, the reproducing stylus, being guided by the guide groove, traces the track within the groove and reproduces the signal in response to variations in the electrostatic capacitance.

In this known system, however, a reproducing stylus guiding groove is provided in the disc. The reproducing stylus is compulsorily guided by this guide groove. It is not possible for the reproducing stylus to undergo operations such as riding over the groove wall of one track, moving into another track and returning to the original track. If the reproducing stylus were to be forced to undergo such an operation, both the groove and the stylus would be damaged. For this reason, it has not been possible in this known system to carry out a special reproduction such as quick-motion picture reproduction, slow-motion picture reproduction, and still-picture reproduction.

Furthermore, since the area of contact between the tip of the reproducing stylus and the guide groove of the disc is small, the stylus easily wears. When the width of the stylus tip reaches the groove width as a result of abrasive wear, the serviceable life of this reproducing stylus ends. Thus, this system is accompanied by the problem of a short life of the reproducing stylus. Another problem is that fine chip particles are abraded from the disc by the tracing action of the reproducing stylus along the guide groove. These chips give rise to difficulties a such as further promotion of the wear and damage of the stylus and the guide groove and an increase of the gap between the electrode at the stylus tip and the recorded surface including the pits within the disc guide groove, whereby the reproduced output decreases because of spacing loss.

If the rotational speed of the disc is set at a low value such as 450 rpm., for example, in order to prolong the life of the stylus tip, the recording wavelength of the information signal recorded in the guide groove will become short. For this reason, a recording apparatus of low price, in which laser light is used, cannot be employed in the recording system, and the disadvantageous employing of a high price recording apparatus using an electron beam becomes unavoidable.

Accordingly, with the aim of overcoming the various problems of the known systems described above, the present inventor has described in the above cited patent application a novel system for recording and reproducing information signals. According to this application, in the recording system, pits are formed in accordance with the information signal being recorded along a spiral track on a recording medium of a flat disc shape, without forming a groove therein. In the reproducing system, a reproducing stylus traces over and along this track to reproduce the recorded information signal. In this proposed system, pilot or reference signals are recorded on or in the vicinity of a track of the information signal such as video signal on a rotary disc. At the time of reproducing, the reference signals are reproduced together with the video signal. A tracking servo control is carried out so that the reproducing stylus traces accurately along the track in response to the reproduced reference signals.

By the use of this previously described system, the recording track has no groove. There is no possibility whatsoever of the reproducing stylus or the recording medium being damaged. The stylus can repeatedly trace the same portion of the track repeatedly a plurality of times, whereby a special reproduction such as still, slow motion, or quick motion reproduction becomes possible. Furthermore, other difficulties of the known system are removed.

However, in the above described system, it is necessary to record the main information signal on the main track. The reference signal for tracking servo control is recorded on the sub-track of the recording medium.

Hence, it becomes necessary to perform the recording not to leave space (guard band) between the tracks, in order to increase the recording capacity on the surface of the recording medium. Accordingly, the adjacent main tracks are in closed contact with each other. The sub-tracks are formed at a center position between the center lines of the main track, and overlapping the edge parts of the adjacent main tracks.

Therefore, the positions of the spots formed by focusing the main optical beam for forming main tracks (for the main information signal) and the sub-optical beam for forming sub-tracks (for the reference signal) on the surface of the recording medium, are extremely close to each other. When the track pitch of the main track is, for example, 1.4 $\mu$m, the distance between the center lines of the main track pitch and sub-track is 0.1 $\mu$m.

In the above case, to prevent the generation of beat interference due to the cross-talk between the adjacent tracks upon reproduction of the recording medium, the error in the distance between the above two optical beam spots must be less than 0.1 $\mu$m.

Accordingly, before starting the recording on the recording medium, it becomes necessary to adjust a focus so that the above two optical beams are focused normally. Normal beam spots are formed. Furthermore, it is necessary to adjust the two beams so that the relative positions of the two optical beam spots are in the correct positions.

The emitting direction of the laser beam emitted from a laser emitting device which is used as a laser beam source, varies according to the variation in temperature. The length of the respective optical path of each of the above two laser beams, the characteristic of the optical systems, and the like, are not completely equal to each other. Thus, the relationship between the relative positions of the spots of the two laser beams varies according to temperature. Hence, during recording on the recording medium, it is necessary to adjust the spot positions so that the relationship between the relative positions of the two laser beam spots do not shift.

In order to accurately perform the above described adjustment, it is necessary to clearly and accurately monitor the distance between the above two beam spots, the focusing of each of the beam spots, and the like.

However, in the case where the allowable value for error in the distance between the beam spots is small, as compared to the diameter of the beam spot, the distance between the beam spots cannot be accurately monitored or measured by providing a monitoring optical system which simply enlarges and images the reflected beam from the beam spot on the surface of the recording medium, since the contour of the beam spots, which are monitored, blurs, and since the resolving power of the monitoring optical system is low. This will be explained in the following specification along with a numerical example.

When a laser beam is employed having, for example, an objective lens having a numerical aperture (N.A.) of 0.9 and wavelength of 4579 Å, the half-value of the diameter of the optical beam spot focused and formed by the objective lens is approximately 0.3 $\mu$m. When the error due to the variation in the distance between the two beam spots is less than 0.1 $\mu$m, as stated above, even if the beam spots are enlarged and monitored, it is very difficult to measure and monitor the relationship between the relative positions of the two beam spots, with a high resolving power. Particularly, when a slit plate is located immediately in front of the objective lens, to accurately form the beam spots into a desired form, the substantial numerical aperture (substantial numerical aperture in the radial direction of the recording medium) is reduced to approximately 0.45 to 0.5, and hence the resolving power decreases. In the above case, the diameter of the beam spot becomes larger than the above 0.3 $\mu$m, and hence the monitoring becomes even more difficult.

Accordingly, an apparatus capable of accurately monitoring the beam spots has been highly desired.

SUMMARY OF THE INVENTION

Accordingly, a general object of the present invention is to provide a novel and useful focus monitoring apparatus in an optical recording apparatus which has solved the above described problems.

Another and more specific object of the invention is to provide a monitoring apparatus, in an optical recording apparatus which forms beam spots on the recording medium from a plurality of light beams, by use of a focusing means. The monitoring apparatus monitors both the images formed by the beams reflected from the beam spots, and the images formed by the reflected beams which are obtained by reflecting the light beams from an optical member and along the optical path leading to the focusing means. According to the apparatus of the present invention, the actual focus of the beam spots on the recording medium can be monitored, and in addition, the distance between the beam spots can be monitored, with a high resolving power.

Still another object of the invention is to provide a monitoring apparatus capable of monitoring both the images formed by the beams reflected from the beam spots, and the images formed by the beams reflected from the optical member in the optical path, in the same field of vision. Monitoring is facilitated by a use of the apparatus of the present invention.

Another object of the invention is to provide a monitoring apparatus capable of simply performing the adjustment to monitor the above images in the same field of vision.

Other objects and further features of the present invention will be apparent from the following detailed description with respect to preferred embodiments of the invention when read in conjunction with the accompanying drawings.

BRIEF DESCRIPTION OF THE DRAWINGS

FIGS. 5, 6 and 7 are, respectively, systematic diagrams of a second, third, and fourth embodiments of the monitoring apparatus of the present invention.

DETAILED DESCRIPTION

Figure 1:
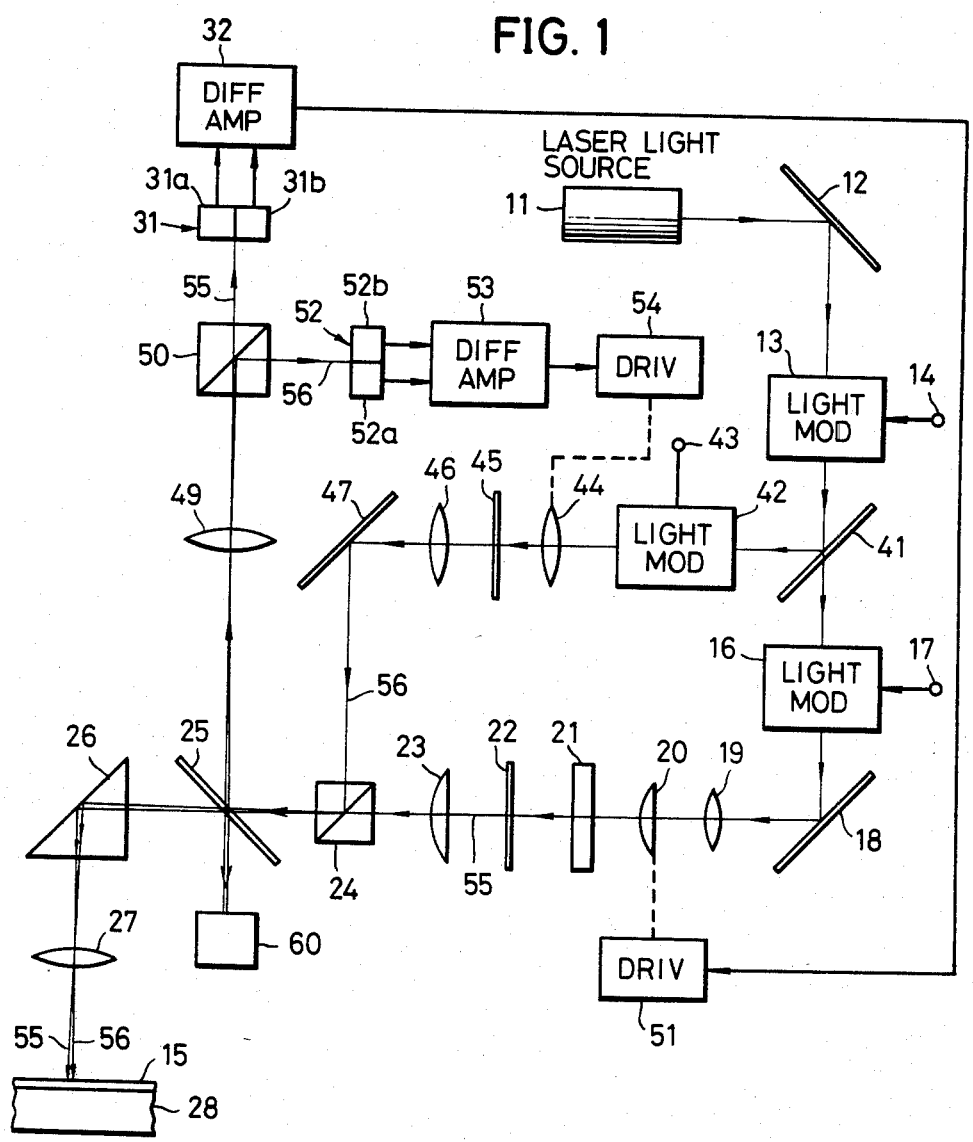
FIG. 1 is a systematic diagram showing one example of an optical recording apparatus having a monitoring apparatus of the present invention.

FIG. 1 illustrates one embodiment of an optical recording apparatus having a monitoring apparatus according to the present invention. A laser light beam is emitted from a laser light source 11 and reflected by a mirror 12 and thus directed to a light modulator 13. A signal is supplied to the light modulator 13 through a terminal 14 responsive to the light beam projection position on a recording medium 15. The light modulator also controls the quantity of the light beam, that is, it carries out a so-called radial compensation. After the light beam has passed through the light modulator 13, through a half mirror 41, it is further modulated in a light modulator 16 by an information signal supplied through a terminal 17. The modulated light beam is reflected by a mirror 18 through a lens 19 and cylindrical lenses 20 and 21, where it is shaped into a light beam of an eliptical cross section. The light beam from the cylindrical lens 21 is directed toward the slit of a slit plate 22. As it passes through this slit, a portion of this light beam, in the vicinity of its long sides in cross section, is shielded, whereby its narrow dimension, i.e., the dimension of its short side, is limited.

After the light beam has passed through the slit plate 22, it passes through a cylindrical lens forming a parallel beam, which in turn passes polarizing prism 24, and a half mirror 25, and is thereafter reflected by a prism 26 through an objective lens 27, from which the light beam is projected onto the recording medium 15, as a main beam 55.

On the other hand, the light beam reflected by the half mirror 41, is supplied to a light modulator 42, and is modulated responsive to a reference signal, used for tracking, which is supplied through a terminal 43. A resulting second modulated light beam 56 is produced as an output from the light modulator 42 and passed through a lens 44, a slit plate 45, and a lens 46, and is reflected by a mirror 47. The light propagation direction is changed by the polarizing prism 24, and is transmitted through the half mirror 25, is reflected by the prism 26, and passes through the lens 27 to be projected onto the recording medium 15 as the second sub-beam 56. The recording medium 15 is placed on a turntable 28 and rotates unitariliy therewith. At the same time, the recording medium 15 is moved together with the turntable 28 in the radial direction thereof. A layer of photoresist is formed on the upper surface of the recording medium 15 and is optically activated by the light beam projected thereon. By carrying out a developing process after this optical activation, pits are formed along a spiral track.

Figure 2:
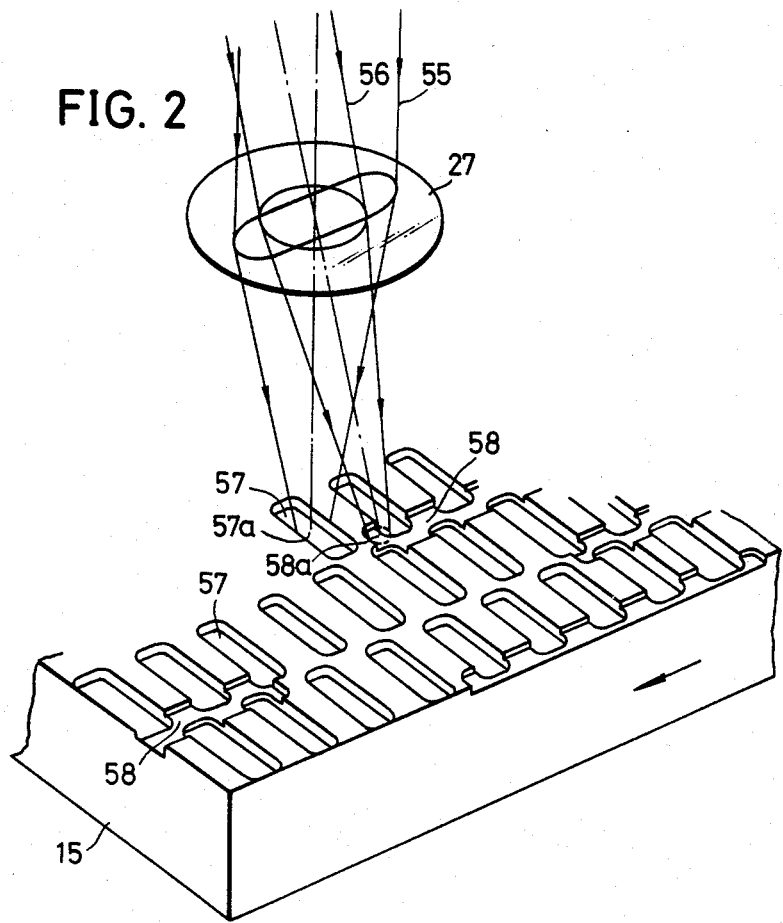
FIG. 2 is an enlarged, fragmentary, perspective view for describing a light beam projection onto the recording medium.

FIG. 2 illustrates the main and sub-light beams 55 and 56 passing through the objective lens 27 and being projected onto the recording medium 15. Pits 57 record the main information signal along a spiral track on the recording medium 15 responsive to a spot 57a of the main light beam 55, while pits 58 record the reference signal between the track turns of the pits 57 responsive to a spot 58a of the sub-light beam 56. The pits cannot be formed by merely projecting light beams onto the recording medium 15. Of course, a developing process is required thereafter, but the light beams and the pits are shown together, simultaneously, in FIG. 2 for convenience in description.

If, in this recording operation, the spot of the light beam 55 and the spot of the light beam 56 overlap, the quantity of light projected onto the overlapping areas will increase. For this reason, the light paths of the respective optical systems of the light beams 55 and 56 is set so that the two spots are projected onto the recording medium in spaced apart areas as shown in FIG. 2, so that there is no overlap.

In order to obtain a high recording density on the recording medium, the track of the main information signal formd by the pits 57 is laid out so that the adjacent track turns are in close contact with each other. The reference signal track formed by the pits 58 is laid along side the central position, equidistant between the central lines of mutually adjacent track turns of the main information signal. The reference signal track partly overlaps the main information signal track. When the recording density is made high in this manner, the required tolerance or allowable fluctuation in the relative positional relation between the beam spots on the recording medium of the light beams 55 and 56 is a very severe value, in the order of, for example, 0.1 $\mu$m or less.

However, due to the various fluctuation factors described above, the light path fluctuates. These light path fluctuations occur within a unit time, such as 30 minutes to 1 hour, required for recording one recording medium. It is necessary to perform uniform recording with the light paths continually in an optimum state.

Accordingly, the present example of the recording apparatus is provided with a light path control means to be described in the following.

The light beams 55 and 56 from the polarizing prism 24 are transmitted through the half mirror 25. At the same time, portions of these light beams are reflected by the half mirror 25 through a lens 49, and a polarizing prism 50. The main light beam 55 passes through this polarizing prism 50 and is projected onto a light detector 31. The symmetry of the light intensity distribution of this light beam 55 is thereby detected. In response to the difference between the output levels of light detectors 31a and 31b, constituting the light detector 31, a differential amplifier 32 produces an output signal which is fed to a driving mechanism 51. This driving mechanism 51 causes, for example, the lens 20 to be displaced so that the center of the light intensity distribution of the light beam entering the slit in the slit plate 22 coincides with the center of that slit. That is, the light intensity distribution of the light beam 55 which has passed through the slit of the slit plate 22 becomes symmetrical.

On the other hand, of the light beams entering the polarizing prism 50, the sub-light beam 56 changes its light path and is projected onto a light detector 52. This light detector 52 comprises a pair of light detectors 52a and 52b such as, for example, photodiodes similar to the light detector 31. The resulting outputs of these light detectors 52a and 52b are fed to a differential amplifier 53, which thereupon feeds an output signal to a driving mechanism 54 responsive to the difference between the levels of the outputs of the light detectors 52a and 52b. The driving mechanism 54 thereupon causes the lens 44 to be displaced so that the center of the intensity distribution of the light beam entering the slit or pin hole of the slit plate 45 coincides with the center of that slit or pin hole.

The beams reflected from the beam spots 57a and 58a on the recording medium 15 through the objective lens 27, is reflected by the prism 26, and half mirror 25, and supplied to a monitoring apparatus 60, as incident light. On the other hand, a portion of each of the light beams passes through the polarizing lens 24, is reflected by the half mirror 25, is reflected at the front surface of the prism 26, and supplied to the monitoring apparatus 60 as incident light after being reflected by the half mirror 25. Accordingly, the beam spots are monitored as described in the following specification.

Figure 3:
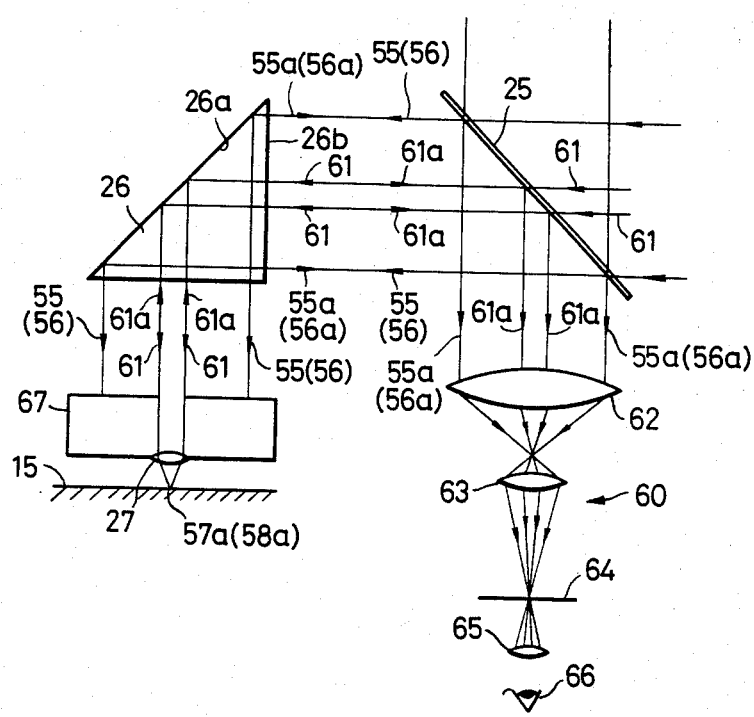
FIG. 3 is a systematic diagram of a first embodiment of a monitoring apparatus of the present invention.

Next, each embodiment of a monitoring apparatus according to the present invention will be described. FIG. 3 shows a first embodiment of the monitoring apparatus 60 of the present invention. In FIG. 3, those parts which are the same as those corresponding parts in FIG. 1 will be designated by the like reference numerals.

The light beam 55 (or 56) from the polarizing prism 24, which has passed through the half mirror 25 is reflected at a reflective surface 26a of the prism 26, and reaches to objective lens 27. Of the reflected light beam 55 (or 56), only a light beam portion 61, incident to the objective lens 27 which is not blocked by a mask 67, is focused by the objective lens 27. The spot 57a (or 58a) is formed on the recording medium 15. Although the sub-light beam 56 in reality exists on a path slightly shifted from that of the main light beam 55, in FIG. 3, the illustration of the sub-light beam 56 is omitted, and only the main light beam 55 is shown.

Figure 4:
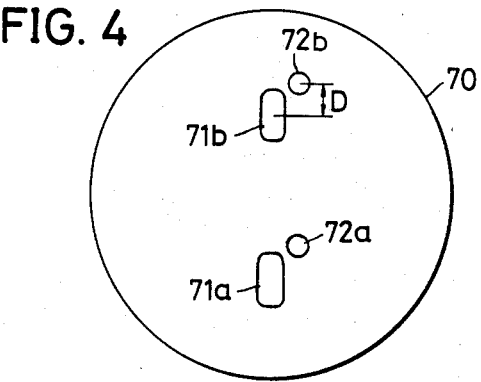
FIG. 4 is a diagram showing an optical image to be monitored by the monitoring apparatus.

A beam 61a reflected from the spots 57a (or 58) passes through the objective lens 27. This reflected beam 61a is reflected by the reflective surface 26a of the prism 26, and further reflected by the half mirror 25, before it reaches a lens 62. The light through the lens 62 passes through a lens 63, and images at the position of a screen 64. This image is monitored by a human eye 66 through an ocular lens 65. In this case, spot images 71a and 72a formed by the beam reflected from the spots 57a and 58a, are monitored within a field of vision 70, as shown in FIG. 4. The spot images 71a and 72a are formed by the beams reflected from the spots 57a and 58a. Hence the focus of the spots 57a and 58a can be known. Accordingly, by monitoring the images 71a and 72a, focusing adjustment is performed by the optical system including the objective lens 27.

However, the diameter of the beam through this objective lens 27 is limited, and the numerical aperture (N.A.) of the optical system including the objective lens 27 is small. Therefore, since the resolving power is low and the contour of each of the images 71a and 72a is a blur, it is difficult to accurately measure the distance between the centers of the two images. Accordingly, the present invention is arranged in the following manner.

A portion of the light beam 55 (or 56) passes through the half mirror 25 and is reflected at a front surface 26b of the prism 26, as a reflected beam 55a (or 56a). The reflected beam 55a (or 56a) images at the position on the screen 64 through the lenses 62 and 63. These images along with the images 71a and 72a formed by the beam reflected from the spot 57a (or 58a), are monitored as images 71b and 72b within the same field of vision 70, through the ocular lens 65. These images 71b and 72b are formed by the reflected light beam 55a (56a) still having a large diameter. Thus, the resolving power is high, and the contours of the images 71b and 72b are sharp, comprising no blur. Hence, these images 71b and 72b are used to measure the distance D between their centers, and the optical system is adjusted so that the relationship between the positions of the images 71b and 72b becomes of a predetermined relationship.

The angle formed between the reflective surfaces 26a and 26b of the prism 26 or the direction of incidence of the light beam supplied to the reflective surface 26b is established, so that the two spatial images are monitored as being distinguishable from each other in the same field of vision. Accordingly, the state of the focus of the spot, the relationship between the relative position of the main and sub-light beams, and the like, on the recording medium can be simultaneously monitored with high accuracy, from the start to the finish of the recording.

When a lens having a focusing distance of 3 mm is used as the objective lens 27, and the numerical aperture and aperture of the objective lens 27 in the radial direction of the recording medium are respectively 0.45 and 2.7 mm, and the focusing distance, numerical aperture, and aperture of the lens 21, 23 (or 46) are respectively 100 mm, 0.125 (F-number is 4), and 25 mm, by placing a mask 67 just in front of the objective lens 27, the light beam, which is a parallel beam going through the slit plate 22 (or 45) and the lens 23 (or 46), forms the spot 57a (or 58a) reduced to 3/100 times its original size, on the recording medium 15, the minor axis (major axis) of the spot 57a (or 58a) is defined by the lens 19 (44) and the major axis (minor axis) of that is defined by the slit plate 22 (45).

In the case where the focusing distance of the lens 62 is 100 mm and the magnification of the lens 63 is 20, the beam 61a reflected from the spot 57a (or 58a) images an image which is enlarged to $(100/3) \times 20$ times its original size, at a position on the screen 64. The spot 57a (or 58a) is formed from a light beam reduced to 3/100 times its original size as described above. Hence the light beam 55 (or 56) is enlarged to $(3/100) \times (100/3) \times 20 = 20$ times its original size and imaged on the screen 64.

Moreover, the light beam through the half mirror 25, reflected by the reflective surface 26b of the prism 26, and reflected by the half mirror 25, is enlarged to $(100/100) \times 20 = 20$ times its original size and imaged at a position on the screen 64.

The beam reflected from the spot 57a (or 58a) and the beam reflected from the reflective surface 26b of the prism 26, are both imaged at a position on the screen 64 under the same magnification (20), to simplify the comparison of the resolving power described in the following. Furthermore, the magnification of the optical system in respect of the above two reflected beams can be different.

Regarding the resolving power of the beam spot imaged at a position on the screen 64, the resolving power of the spot formed by the reflected beam 55a (or 56a) which is reflected from the reflective surface 26b, is larger than the resolving power of the spot formed by the beam 61a reflected from the spot 57a (or 58a). The reason for this is in that, the optical system is a non-aberrant system. When a coherent light is used, the resolving power of the optical system, is constructed by combining various optical systems, and is generally determined by the substantial numerical aperture of the optical system having the minimum substantial numerical aperture of the optical systems composing the optical system as a whole.

That is to say, in an optical system which enlarges and images the beam 61a reflected from the spot 57a (or 58a),. the diameter of the reflected beam 61a is determined by the aperture (2.7 mm in the above case) of the objective lens 27 in the radial direction of the recording medium. Accordingly, the substantial numerical aperture of the lens 62 can be determined from the diameter of the reflected beam which is determined from the aperture of the above objective lens 27 in the radial direction of the recording medium, as 2.7 mm, and the focusing distance of the lens 62 which is 100 mm, to be $(1.35/100) = 0.0135$ mm. Similarly, the substantial numerical aperture of the lens 63 can be 0.0135. Therefore, the optical system having a numerical aperture of 0.0135 for monitoring the beam 61a reflected from the spot 57a (or 58a) enlarges the beam projected on the screen 64 with a magnification of 20.

The minimum half-value of the spot imaged at a position on the screen 64 by the beam 61a reflected from the spot 57a (or 58a), is $(0.45/0.0135) \times 0.6 \times 20 = 400$ μm, since the diameter of the spot is inversely proportional to the numerical aperture. As the entering beam 61 to the objective lens 27 is a parallel beam, the reflected beam 61a is also a parallel beam, thus the objective lense 27 does not contribute the magnification, but the numerical aperture of the lens 27 affects the resolving power of the monitoring system.

On the other hand, in a system which enlarges and images the beam 55a (or 56a) reflected from the reflective surface 26b of the prism 26, the minimum numerical aperture is equal to the numerical aperture 0.125 of the lenses 62 and 63. Thus the half-value of the minimum spot, formed at a position on the screen 64 by the enlarging and imaging the beam 55a (or 56a) reflected from the reflective surface 26b of the prism 26, is approximately 43 μm. This value, compared with the half-value, 400 μm, of the minimum spot obtained by enlarging and imaging the beam reflected from the spot 57a (or 58a) at a position on the screen 64, is smaller by approximately one digit.

The value 1 μm on the recording medium 15 corresponds to approximately 670 μm on the screen. Accordingly, the above half-value 43 μm at a position on the screen 64 corresponds to approximately 0.064 μm on the recording medium 15. Therefore, the relationship between the relative position of the main and subbeams, by use of the above optical system which enlarges and images the reflected beam 55a (or 56a) reflected from the reflective surface 26b of the prism 26, can be monitored and measured with an accuracy of 0.1 μm or less.

A second embodiment of a monitoring apparatus of the present invention is shown in FIG. 5. In the present embodiment of the invention, a reflector 80 is used instead of the prism 26. The beam 55 (or 56) from the polarizing prism 24 through the half mirror 25, is reflected by the reflector 80. Only the light beam portion 61 is focused by the objective lens 27. The beam reflected from the spot 57a (or 58a) through the objective lens 27, is reflected by the reflector 80 and half mirror 25, and the images 71a and 72a shown in FIG. 4 is monitored by the eye 66 through the lenses 62, 63, and 65.

On the other hand, a portion of the beam 55 (or 56) is reflected by the half mirror 25, and moves toward the lens 49 through a half mirror 81. The portion of the beam 55 (or 56) reflected by the half mirror 25, is reflected by the half mirror 81 and reaches the lens 62 through the half mirror 25. This beam is monitored by the eye 66 through the lenses 62, 63, and 65, in the same field of vision 70 as the above images 71b and 72b of FIG. 4.

In the above embodiment of the invention, by slightly shifting the direction of the half mirror 81 in the advancing direction of the beam 55 (or 56) which is reflected by the half mirror 25, relative to the perpendicular position, the images 71b and 72b do not overlap with the images 71a and 72a. Mirror 81 can be adjusted so that the images are within the same field of vision 70. This adjustment can be made solely by adjusting the half mirror 81, without moving the optical path or the optical system. Accordingly, the present embodiment is an embodiment more desirable than the first embodiment.

Figure 6:
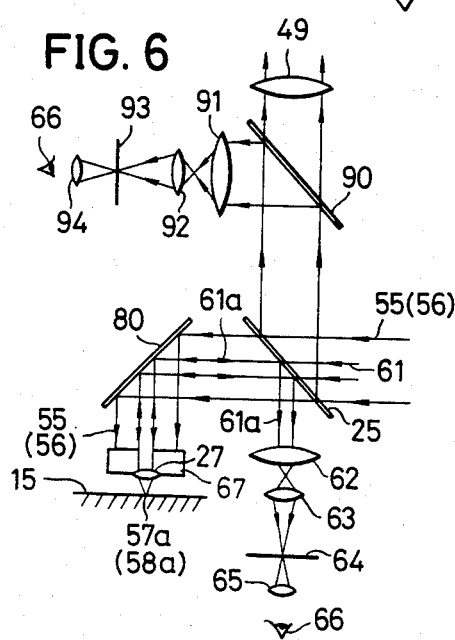

A third embodiment of a monitoring apparatus of the present invention is shown in FIG. 6. In FIG. 6, those parts which are the same as corresponding parts in FIGS. 3 and 5 are designated by the like reference numerals, and their description will be omitted. The beam reflected from the spot 57a (or 58a) is reflected by the reflector 80 and half mirror 25. Its image (corresponding to the images 71a and 72a of the above first embodiment) is monitored by the eye 66 in the optical system comprising the above lenses 62, 63, and 65. On the other hand, a portion of the light beam 55 (or 56) reflected by the half mirror 25 and moving towards the lens 49, is reflected by a half mirror 90, and imaged at a position on a scale plate 93 by lenses 91 and 92. This image (corresponding to the images 71b and 72b of the above first embodiment) is monitored by the eye 66 through an ocular lens 94.

A fourth embodiment of a monitoring apparatus of the present invention is shown in FIG. 7. In FIG. 7, those parts which are the same as those corresponding parts in FIGS. 3, 5 and 6 are designated by the like reference numerals and their description will be omitted. As opposed to the embodiment of FIG. 6 in which the half mirror 90 is provided in the optical path leading to the lens 49 from the half mirror 25, in the present embodiment, the half mirror 90 is provided between the polarizing prism 24 and the half mirror 25. A portion of the light beam from the polarizing prism 24 is reflected by the half mirror 90 towards the lenses 91 and 92, and the image is monitored by the eye 66.

Further, this invention is not limited to these embodiments but various variations and modifications may be made without departing from the scope of the invention.

What is claimed is:

1. A monitoring apparatus for an optical recording system, said optical recording system including means for producing a first light beam and a second light beam, means for modulating said first and second light beams by a first signal and a second signal, said first and second light beams advancing in optical paths having an approximately common optical path segment, said advance being toward a recording medium, masking means positioned in said common optical path segment for eliminating portions of said first and second light beams incident thereupon in order to produce remaining portions of said first and second light beams, said remaining portions having diameters which are smaller than the respective diameters of the first and second light beams at said masking means, and focusing means in the common optical path segment for focusing said remaining portions of the first and second light beams from said masking means to form a first beam spot and a second beam spot on the recording medium, said first and second light beams being reflected at said first and second beam spots and going back into the common optical path segment as third and fourth light beams, said monitoring apparatus comprising:
first reflecting means having at least a part in the common optical path segment before the focusing means for partially reflecting said first and second light beams back into the common optical path segment;
second reflecting means in the common optical path segment before the first reflecting means for directing the parts of the first and second light beams reflected by the first reflecting means and the third and fourth light beams out of the common optical path segment;
imaging means for forming first images of said parts of said first and second light beams and second images of said third and fourth light beams which are directed out of the common optical path segment by said second reflecting means; and
monitoring means for monitoring said first and second images formed by said imaging means, said monitoring means comprising a scale plate on which said first and second images are separately visible within the same field of vision, whereby a distance between the centers of said first and second beam spots is measurable through a corresponding separation of said first images on said scale plate and the accuracy of the focus of said first and second light beams can be monitored through said second images on said scale plate,
said first reflecting means having a flat reflective surface for reflecting the first and second light beams toward said second reflecting means.

2. An apparatus as described in claim 1 in which said first reflecting means comprises a prism having said flat reflective surface and another reflective surface which changes a direction of the common optical path segment toward said focusing means by reflecting said first and second light beams and toward said second reflecting means by reflecting said third and fourth light beams, said flat reflective surface being positioned in the common optical path segment before said other reflective surface.

3. An apparatus as described in claim 1 in which said second reflecting means comprises a half mirror which passes said first and second light beams and reflects the third and fourth light beams as well as the reflected first and second beams from said first reflecting means toward said imaging means.

* * * * *